United States Patent [19]
Bauer et al.

[11] 4,313,538
[45] Feb. 2, 1982

[54] FILM CASSETTE WITH AN OPENING FOR EXPOSING DATA ON A FILM ACCOMMODATED THEREIN

[75] Inventors: Walter Bauer; Heinrich Färber, both of Munich, Fed. Rep. of Germany

[73] Assignee: Agfa-Gevaert Aktiengesellschaft, Leverkusen, Fed. Rep. of Germany

[21] Appl. No.: 162,523

[22] Filed: Jun. 24, 1980

[30] Foreign Application Priority Data

Jun. 27, 1979 [DE] Fed. Rep. of Germany ....... 2925837

[51] Int. Cl.³ ..................... B65D 81/30; H05G 1/28; G03B 41/16
[52] U.S. Cl. .................................. 206/455; 206/459; 206/634; 220/346; 250/468; 250/480
[58] Field of Search ............... 206/455, 456, 449, 459, 206/634; 220/346; 250/480, 468

[56] References Cited

U.S. PATENT DOCUMENTS

| | | | |
|---|---|---|---|
| 2,338,192 | 1/1944 | Martin | 220/346 |
| 3,703,272 | 11/1972 | Lareau | 250/480 |
| 4,194,625 | 3/1980 | Stievenart et al. | 206/455 |

Primary Examiner—William T. Dixson, Jr.
Attorney, Agent, or Firm—Peter K. Kontler

[57] ABSTRACT

A film cassette, particularly an X-ray film cassette, includes a housing which bounds a compartment for accommodating a film and having an opening for exposing an image on a predetermined portion of the film in the compartment. The opening is light-tightly closed by a closure which is displaceable between its closed and open positions and which is latched in its closed position by a latching member which is pivotally mounted on the closure and engages the housing at one of its ends. The other end of the rocker is accessible to an actuating pin of an exposing device through an access opening in the closure, so that the actuating pin can pivot the rocker into its releasing position in which the closure is free to move towards its open position, and displace the closure between its closed an open positions. When the closure is open, the exposing device exposes data onto a portion of the film in the cassette which is aligned with the opening.

12 Claims, 4 Drawing Figures

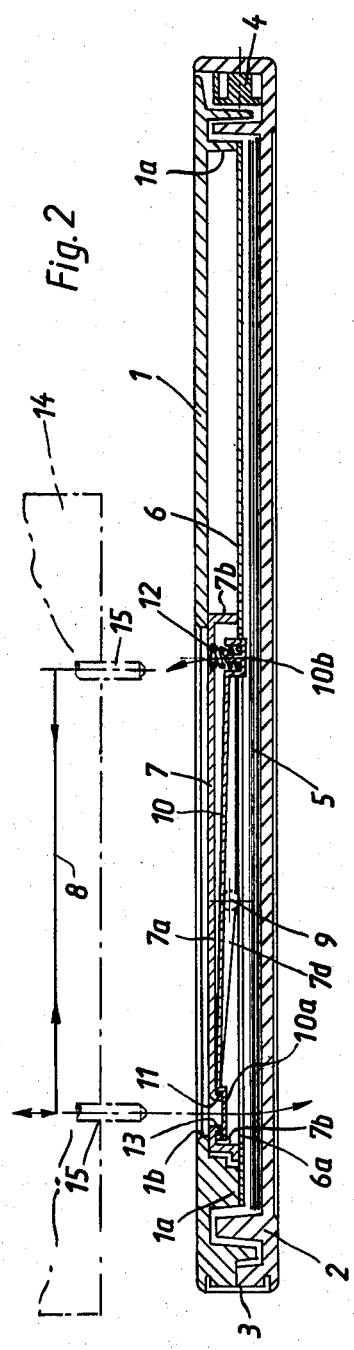
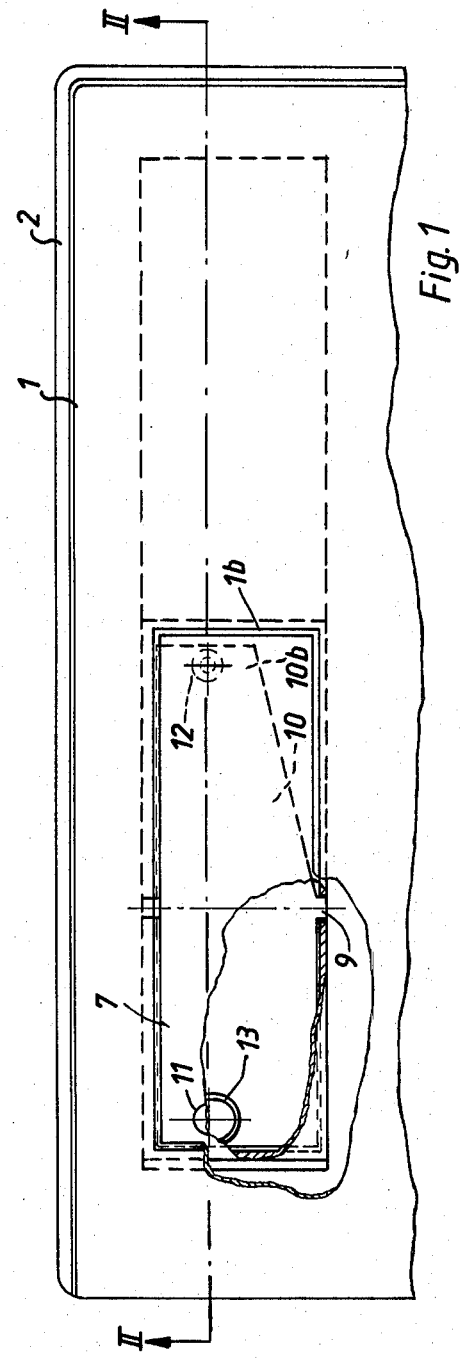

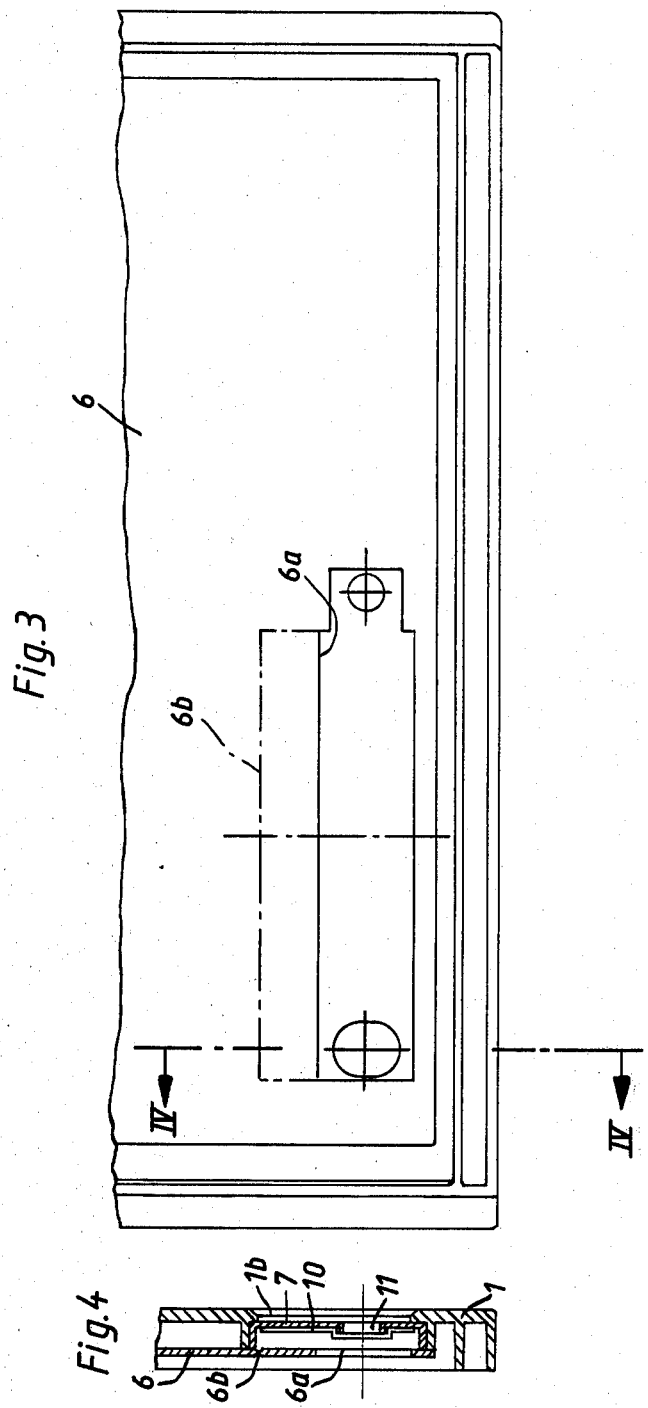

FILM CASSETTE WITH AN OPENING FOR EXPOSING DATA ON A FILM ACCOMMODATED THEREIN

BACKGROUND OF THE INVENTION

The present invention relates to a film cassette, particularly to an X-ray film cassette, which is provided with a closable opening through which data can be exposed onto a predetermined portion of a film accommodated in an internal compartment of the cassette.

Cassettes of this type are already known and currently available on the market in a variety of constructions. In one known cassette of this type which has been disclosed in the German Patent DE-PS No. 26 46 725, the opening through which the data can be exposed on the predetermined portion of the film in the cassette is closable by means of a plate-shaped closure which is mounted on the cassette for sliding displacement between its closed position where it extends across the opening and light-tightly covers the same, and an open position where it clears the opening. In order to avoid the possibility that the closure could be accidentally displaced towards its open position during the handling of the cassette and thus would expose the predetermined portion of the film in the cassette to ambient light, a latching member is mounted on the closure and engages the housing in the closed position of the closure to hold the closure in this position until the latching member is moved by an outside influence towards its releasing position in which it is disengaged from the housing and thus permits the shifting of the closure towards its open position. The latching member is being biased towards its latching position by a biasing force which has to be overcome by the external influence before the latching member moves into its releasing position. The latching member of this cassette is contructed as a rocker which is held by a spring in its latching position in which it holds the closure in its closed position. The rocker can be displaced against the action of the spring force out of its latching position and into its releasing position by means of magnetic force acting on the rocker from the outside, so that the closure can be displaced towards its open position upon movement of the rocker into its releasing position due to the action of the external magnetic force thereon, and data can be exposed on the predetermined portion of the film accommodated in the internal compartment of the cassette through the now unobscured opening. This data exposure onto the film is performed in an exposure device which has been especially developed and constructed for this purpose and which projects the respective individual data onto the predetermined portion of the film in the cassette. To provide the data on the film, the cassette containing this film is introduced into the exposing device which is also equipped with a magnet acting on the rocker and displacing the same into its releasing position upon introduction of the cassette into the exposing device. In addition thereto, this device includes a gripping or actuating arrangement which is capable of engaging an external projection on the closure and shifts the latter from its closed position towards its open position prior to the exposure of the data on the predetermined portion of the film in the cassette but subsequent to the movement of the rocker by the magnet into the releasing position, and back again into the closed position after the termination of the exposure and prior to the withdrawal of the cassette from the exposing device.

As advantageous as this cassette may be in certain respects, it is disadvantageous in other respects. So, for instance, this cassette is rather expensive because of its quite complex construction and since the rocker must be made of a ferromagnetic material. In addition thereto, the above-discussed construction of the cassette requires the use of a specially constructed device for exposing the requisite data onto the predetermined portion of the film on the cassette, which exposing device must be equipped with a magnet. Furthermore, the actions of the magnet and of the actuating arrangement of the exposing device must be synchronized with one another, which further contributes to the high cost of use of film cassettes of this type.

OBJECTS AND SUMMARY OF THE INVENTION

Accordingly, it is a general object of the present invention to avoid the disadvantages of the prior art.

More particularly, it is an object of the present invention to provide a film cassette, especially an X-ray film cassette, which is not possessed of the disadvantages of the prior-art cassettes of this type.

Still another object of the present invention is to present a new construction of a closing mechanism for closing an opening of the cassette through which data can be exposed onto a predetermined portion of the film accommodated in the internal compartment of the cassette.

It is an additional object of the present invention to so construct the closure as to avoid the possibility that such closure would be unintentionally displaced towards its open position during the handling of the cassette, such as by vibrations, impacts or other application of forces to the closure.

A concomitant object of the present invention is to so design the cassette of the type here under consideration as to be simple in construction, inexpensive to manufacture, and reliable in operation nevertheless.

Yet another object of the present invention is to so construct the cassette as to require only a simple and rudimentary equipment in the exposing device for displacing the closure between its closed and open position.

Furthermore, it is an object of the present invention to provide a possibility in the cassette of this type to conform the size of the opening to the applicable requirements.

In pursuance of these objects and other which will become apparent hereafter, one feature of the present invention resides in a film cassette, particularly an X-ray film cassette, which comprises, briefly stated, a housing bounding a compartment for accommodating a film and having an opening for exposing an image on a predetermined portion of the film in the compartment of the cassette; and means for light-tightly closing the opening, including a closure mounted in the housing for displacement between a closed position of covering, and an open position clearing, the opening, and having an access aperture therethrough, and a latching member mounted on the closure behind the access aperture for movement between a latching position in which one portion thereof latchingly engages the housing and another portion thereof light-tightly covers the access aperture, and a releasing position in which the one portion thereof is disengaged from the housing, the latching member being biased, preferably spring-biased, towards its latching position, and the access aperture providing access to the one portion of the latching member for an actuating pin (which preferably forms a part of an exposing device) to enable such actuating pin to move the latching member toward the releasing position thereof. Advantageously, the closure is substantially plate-shaped and is mounted in the housing for displacement in and opposite to a predetermined direction along its plane, together with the actuating pin which is introduced into the access aperture and holds the latching member in its releasing position.

When the film cassette is constructed in the above-mentioned manner, there is obtained a simple possibility of unlatching and opening the closure of the opening of the cassette through which data may be exposed onto the film in the open position of the closure. Furthermore, the manufacturing expenses of the cassette of the present invention are much lower than those of film cassettes of conventional constructions. Yet, the latching member reliably holds the closure in its closed position in the absence of action of the actuating pin thereon, so that the closure can not be accidentally displaced towards its open position during the handling of the cassette.

According to a currently preferred concept of the present invention, the housing of the cassette has a latching detent, preferably constructed as a recess in the housing. Then, the latching member is advantageously constructed as a two-armed lever pivotally mounted on the closure and having one end which engages the detent or recess and another end which is situated behind the access aperture. Preferably, the closure has a substantially plate-shaped main portion and a pair of lateral walls extending inwardly from the main portion and is mounted in the housing or displacement along the plane of the main portion, the latching member being supported on a shaft which is, in turn, supported on the lateral walls.

It is further advantageous when a compression spring is arranged between the closure and the one end of the lever and presses against the same to bias the lever toward its latching position. The closing means preferably comprises means for forming a light barrier at the access aperture in the latching position of the lever, the light-barrier forming means including mating projections and recesses on the closure at the access aperture and on the other end of the lever.

A particularly advantageous construction of the cassette of the present invention is obtained when the housing includes a cassette wall component that includes an external wall and an internal wall which are substantially parallel to one another and which have respective portions that bound the aforementioned opening. Then, the closure is advantageously received between and guided by the internal and external walls of the cassette wall component. The external wall is preferably provided with a plurality of inwardly extending distancing projections, the internal wall being arranged on and, preferably, connected to, the distancing projections. The aforementioned plate-shaped main portion may internally contact the external wall of the cassette wall component, and a plurality of support projections may extend from the main portion into contact with the internal wall of the cassette wall component.

In order to permit the cooperation of the cassette of the present invention with different types of exposing devices, the cassette is so constructed as to be able to vary the size of the opening through which the particular exposing device exposes the data on the predetermined portion of the film in the cassette. To achieve this, the closure is so constructed as to be able to cover the largest possible opening, but a light-intercepting member which bounds a smaller opening is arranged underneath or inwardly of the closure. Then, this light-intercepting member which may constitute an internal wall of the cassette may include a weakened portion delimiting a break-away section which is removable from the light-intercepting member by breaking the same away along the weakened portion so as to enlarge the opening in the light-intercepting member. This is particularly applicable to the current situation where two different sizes of the exposing opening are being used, that is, a narrower one, also referred to as European, and a wider one, also called American.

The novel features which are considered as characteristic of the invention are set forth in particular in the appended claims. The X-ray film cassette, both to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a top plan view of a fragment of an X-ray cassette embodying the present invention;

FIG. 2 is a cross-sectional view taken on line II—II of FIG. 1;

FIG. 3 is a fragmentary bottom plan view of a lid of the cassette of FIGS. 1 and 2; and FIG. 4 is a cross-sectional view taken on line IV—IV of FIG. 3.

DETAILED DESCRIPTION OF THE PREFERRED EMBODIMENT

Referring now to the drawing in detail, and first to FIGS. 1 and 2 thereof, it may be seen that the reference numeral 1 has been used to indicate a lid of the cassette of the present invention, while the reference numeral 2 indicates the bottom part of the cassette. The lid 1 and the bottom part 2 are connected to one another by means of a hinge 3. A cassette closing device of a conventional construction which need not be discussed here is arranged at that side of the cassette which is situated opposite to the hinge 3. A pack 5 consisting of an X-ray film and of reinforcing foils is supported on the bottom part 2 of the cassette. Projections or ribs 1a extending toward the bottom part 2 of the cassette are formed at the inner side of the cassette lid 1, and a cover plate or internal wall 6 is supported thereon. As may best be seen in FIGS. 3 and 4, the cover plate 6 is formed with a cutout 6a which defines an exposing opening situated upwardly of the film contained in the pack 5, as considered in the position illustrated in FIGS. 1 and 2. As also seen particularly well in FIGS. 3 and 4, the cover plate 6 is formed with an embossed break-away line or weakened portion 6b, along which a section of the cover plate 6 can be broken away in order to increase the size of the opening 6a.

The cassette lid 1, or its external wall, is provided, in registry with the opening 6a in the cover plate 6, with an opening 1b which has a size substantially corresponding to that of the opening 6a, preferably after the section bounded by the weakened portion 6b has been broken away. A closure 7 is accommodated between the cassette lid 1 and the cover plate 6 and is guided along elongated guides provided on the cassette lid 1, which have not been illustrated in the drawing in order not to unduly encumber the same, and which extend parallel to a line 8 shown in FIG. 2, so that the closure 7 is guided for sliding displacement in the direction of the arrowheads indicated on the line 8. Thus, the closure 7 can be shifted in the direction of the longitudinal edges of the opening 1b. FIG. 2 also shows that the closure 7 includes a main portion 7a which covers the opening 1b (and also the opening 6a) in the closed position of the closure 7, as well as support projections 7b which extend from the main portion 7a toward and laterally beyond the opening 6a in its original condition, or as enlarged by breaking away the aforementioned section along the weakened portion 6b. In addition thereto, inwardly extending lateral portions or flanges 7d are provided at the longitudinal edges of the main portion 7a of the closure 7. An axle 9 supporting a two-armed lever or rocker 10 is mounted on these lateral flanges 7d. Finally, the plate-shaped main portion 7a of the closure 7 is formed with an access aperture or bore 11 which is so situated that it remains in registry with the opening 1b of the cassette lid 1 in all possible shifted positions of the closure 7.

The rocker 10 which is pivotably supported on the closure 7 essentially consists of an elongated strip which can consist of a rigid synthetic plastic material and which has two ends indicated at 10a and 10b. The end 10a of the rocker 10 is so configurated as to cover the access aperture 11 in the closure 7 in a latching position of the rocker 10, and the other end 10b of the rocker 10 is formed with a socket 11b for receiving one end of a compression spring 12, the other end of which presses against the inner side of the closure 7. In the latching position illustrated in FIG. 2, the rocker 10 is so arranged that the other end 10b thereof which cooperates with the compression spring 12 extends into the opening 6a of the cover plate 6, which thus constitutes a detent or a detaining recess. Thus, by being received within the detaining recess formed by the opening 6a of the cover plate 6, and by being mounted on the shaft 9 which is immovable in the longitudinal direction of the closure 7, the rocker 10 detains the closure 7 in its illustrated closed position and prevents its longitudinal shifting towards its non-illustrated open position. The end 10a of the rocker or latching member 10 is formed with a circular depression which cooperates with an annular projection or bulge formed at the inner side of the closure 7 around the access aperture 11 and forms therewith a light barrier 13 which prevents ambient light from reaching the interior or internal compartment of the cassette through the axis opening 11 of the closure 7.

Having so discussed the construction of the cassette of the present invention, the handling thereof by an exposing device capable of illuminating, or exposing data or other images on, that portion of the film contained in the pack 5 which is aligned with the openings 1b and 6a in its original or enlarged state will now be briefly discussed.

The cassette is introduced into the exposing device 14 which has been illustrated in FIG. 2 only in phantom lines inasmuch as the details of its construction are conventional and form no part of the present invention, except for the features which will be discussed below. The exposing device 14 is so constructed as to prevent penetration of ambient light toward that part of the cassette which contains the opening 1b. In order to expose the data on the predetermined portion of the film contained in the pack 5 which is aligned with the openings 1b and 6a, the exposing device 14 is first so operated that an actuating pin 15 thereof is introduced into the access aperture 11 of the closure 7 so that the actuating pin 15 contacts the end 10a of the rocker 10 and, during a further movement thereof as indicated by the lower arrowhead of the double-headed arrow, moves the end 10a of the rocker 10 opposite to the biasing action of the spring 12 towards a releasing position of the rocker 10, that is, moves the same in the counterclockwise direction as considered in FIG. 2. During this movement towards the releasing position, the end 10b of the rocker 10 is removed from the opening 6a of the cover plate 6, as a result of which the closure 7 is unlatched. When this is accomplished, a second phase of the closure-opening operation can be initiated. During this second phase, the actuating pin 15 is caused to move along the line 8 and displaces the closure 7 in the space between the cassette lid 1 and the cover plate 6 in the rightward direction as considered in FIG. 2. After the termination of this rightward displacement of the closure 7 with the actuating pin 15, the aforementioned portion of the film contained in the pack 5 is accessible through the opening 1b of the lid 1 and the opening 6a, of initial or enlarged size, of the cover plate 6 so that it can be illuminated by a conventional non-illustrated illuminating or data-exposing arrangement present in the exposing device 14. After the termination of the illumination or exposure, the actuating pin 15 is again moved, leftwardly as considered in FIG. 2, in the direction of the line 8, to be withdrawn from the access aperture 11 after the closure 7 has reached its closed position of FIG. 2 in which it covers the opening 6a of the cover plate 6. As the actuating pin 15 is being withdrawn, the compression spring 12 moves the rocker 10 back into the latching position illustrated in FIG. 2 so that the 10a of the rocker 10 light-tightly covers the access aperture 11 due to the provision of the light barrier 13. On the other hand, the end 10b of the rocker 10 re-enters the opening 6a, as a result of which the closure 7 becomes latched in its closed position and can no longer be displaced towards its open position either by vibrations, by impacts, or by erroneous manual influence thereon. Thus, in this condition, the cassette can be removed from the exposing device 14 and transported to a remote location or to a different device or station at which the cassette is further handled in accordance with known principles.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. A film cassette, particularly an X-ray film cassette, comprising a housing bounding a compartment for accommodating a film and having an opening for exposing an image on a predetermined portion of the film in said compartment; and means for light-tightly closing said opening, including a closure mounted in said housing for displacement between a closed position of covering, and an open position of clearing, said opening, and having an access aperture therethrough, and a latching member mounted on said closure behind said access aperture for movement between a latching position in which one portion thereof latchingly engages said housing and another portion thereof light-tightly covers said access aperture and a releasing position in which said one portion thereof is disengaged from said housing, said latching member being biased toward said latching position, and said access aperture providing access to said other portion of said latching member for an actuating pin to enable the latter to move said latching member toward said releasing position thereof.

2. A film cassette as defined in claim 1, wherein said closing means further includes at least one spring biasing said latching member toward said latching position thereof.

3. The film cassette as defined in claim 1, wherein said closure is substantially plate-shaped and is mounted in said housing for displacement in and opposite to a predetermined direction along its plane, together with the actuating pin introduced into said access aperture and holding said latching member in said releasing position thereof.

4. The film cassette as defined in claim 1, wherein said housing has a latching detent; and wherein said latching member is a two-armed lever pivotally mounted on said closure and having one end constituting said one portion and engaging said detent, and another end constituting said other portion and situated behind said access aperture.

5. The film cassette as defined in claim 4, wherein said detent is a recess in said housing.

6. The film cassette as defined in claim 4, wherein said closure has a substantially plate-shaped main portion and a pair of lateral walls extending inwardly from said main portion and is mounted in said housing for displacement along the plane of said main portion; and wherein said closing means further includes a shaft supported on said lateral walls of said closure and mounting said latching member thereon for pivoting relative to said closure.

7. The film cassette as defined in claim 4, wherein said closing means further includes a compression spring extending between and pressing against said closure and said one end of said lever to bias the latter toward said latching position thereof.

8. The film cassette as defined in claim 4, wherein said closing means further comprises means for forming a light barrier at said access aperture in said latching position of said lever, including mating projections and recesses on said closure at said access aperture and on said other end of said lever.

9. The film cassette as defined in claim 4, wherein said housing includes a cassette wall component including an external wall and an internal wall substantially parallel to said external wall, said walls having respective portions bounding said opening; and wherein said closure is received between and guided by said walls.

10. The film cassette as defined in claim 9, wherein said external wall has a plurality of inwardly extending distancing projections; and wherein said internal wall is arranged on said distancing projections.

11. The film cassette as defined in claim 9, wherein said closure has a substantially plate-shaped main portion internally contacting said external wall of said wall component, and a plurality of support projections contacting said internal wall.

12. The film cassette as defined in claim 9, wherein said internal wall includes a weakened portion delimiting a breakaway section in that portion of said internal wall which bounds said opening, said section being removable from said internal wall by breaking the same away along said weakened portion so as to enlarge said opening in said internal wall.

* * * * *